United States Patent
Chang et al.

(10) Patent No.: US 8,908,646 B2
(45) Date of Patent: *Dec. 9, 2014

(54) RANDOM ACCESS METHOD, EVOLVED NODE B, AND TERMINAL EQUIPMENT

(71) Applicant: Huawei Technologies Co., Ltd., Shenzhen, Guangdong (CN)

(72) Inventors: Junren Chang, Beijing (CN); Yajuan Li, Beijing (CN); Shulan Feng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/920,668

(22) Filed: Jun. 18, 2013

(65) Prior Publication Data

US 2013/0294408 A1    Nov. 7, 2013

Related U.S. Application Data

(63) Continuation of application No. 13/426,263, filed on Mar. 21, 2012, now Pat. No. 8,488,560, which is a continuation of application No. 13/253,709, filed on Oct. 5, 2011, now Pat. No. 8,411,642, which is a continuation of application No. PCT/CN2009/071200, filed on Apr. 9, 2009.

(51) Int. Cl.
*H04W 4/00*    (2009.01)
(Continued)

(52) U.S. Cl.
CPC ........... *H04W 36/0005* (2013.01); *H04L 5/001* (2013.01); *H04L 5/0037* (2013.01); *H04W 36/0077* (2013.01); *H04W 36/06* (2013.01); *H04W 48/08* (2013.01); *H04W 72/00* (2013.01); *H04W 72/042* (2013.01); *H04W 74/0833* (2013.01); *H04W 88/08* (2013.01)
USPC ........ 370/331; 370/395.2; 370/400; 455/437; 455/438; 455/439; 455/440; 455/442

(58) Field of Classification Search
USPC ........ 370/328, 329, 331, 395.2; 455/436–444
See application file for complete search history.

(56) References Cited

U.S. PATENT DOCUMENTS

2004/0176094 A1    9/2004    Kim et al.
2007/0293224 A1    12/2007    Wang et al.
(Continued)

FOREIGN PATENT DOCUMENTS

CN    1917693 A    2/2007
CN    1917694 A    2/2007
(Continued)

OTHER PUBLICATIONS

TSG-RAN WG1 #53bis, "Carrier aggregation in LTE-Advanced", Ericsson, Jun. 30-Jul. 4, 2008, 6 pages.
(Continued)

*Primary Examiner* — Alvin Zhu (57) ABSTRACT

A random access method, an evolved Node B (eNB), and a terminal equipment are provided. The method includes: determining target component carriers to which a User Equipment (UE) is to be handed over, and notifying the UE of information about the target component carriers through a source eNB; and after receiving a dedicated random access preamble sent by the UE, sending a random access response message on at least one component carrier in the target component carriers. The terminal equipment includes: a handover command receiving unit, a sending unit, and a random response receiving unit. Therefore, in a random access procedure of cell handover, the eNB is capable of determining downlink component carriers that a UE monitors, thereby increasing utilization rate of downlink resources.

12 Claims, 8 Drawing Sheets

(51) Int. Cl.
*H04W 36/00* (2009.01)
*H04L 5/00* (2006.01)
*H04W 36/06* (2009.01)
*H04W 48/08* (2009.01)
*H04W 72/00* (2009.01)
*H04W 72/04* (2009.01)
*H04W 74/08* (2009.01)
*H04W 88/08* (2009.01)

(56) References Cited

U.S. PATENT DOCUMENTS

| | | |
|---|---|---|
| 2008/0039090 A1 | 2/2008 | Jin et al. |
| 2008/0233960 A1 | 9/2008 | Kangude et al. |
| 2008/0268850 A1 | 10/2008 | Narasimha et al. |
| 2009/0046629 A1 | 2/2009 | Jiang et al. |
| 2009/0191874 A1 | 7/2009 | Du et al. |
| 2009/0197605 A1 | 8/2009 | Kawasaki |
| 2010/0254351 A1 | 10/2010 | Wang et al. |
| 2010/0303039 A1 | 12/2010 | Zhang et al. |

FOREIGN PATENT DOCUMENTS

| | | |
|---|---|---|
| CN | 101035103 A | 9/2007 |
| CN | 101170812 A | 4/2008 |
| CN | 101340707 A | 1/2009 |
| CN | 101340714 A | 1/2009 |
| EP | 2 173 109 A1 | 4/2010 |
| WO | WO 2007/142492 A2 | 12/2007 |
| WO | WO 2007/149290 A2 | 12/2007 |
| WO | WO 2009/038300 A1 | 3/2009 |
| WO | WO 2010/111820 A1 | 10/2010 |

OTHER PUBLICATIONS

3GPP TSG RAN WG1 Meeting #56bis, "Initial random access in asymmetric carrier aggregation", Samsung, Mar. 23-27, 2009, 5 pages.
International Search Report dated Jan. 21, 2010 in connection with International Patent Application No. PCT/CN2009/071200.
3GPP TSG RAN WG1 Meeting #56, "Initial random access in asymmetric carrier aggregation", Samsung, Feb. 9-13, 2009, 5 pages.
Office Action dated Jan. 9, 2012 in connection with U.S. Appl. No. 13/253,709.
Written Opinion of the International Searching Authority dated Jan. 21, 2010 in connection with International Patent Application No. PCT/CN2009/071200.
Written Opinion of the International Searching Authority dated Dec. 31, 2009 in connection with International Patent Application No. PCT/CN2009/071069.
Partial Translation of Office Action dated Jun. 26, 2012 in connection with Chinese Patent Application No. 200980117320.2.
Translation of Chinese Search Report dated May 14, 2012 in connection with Chinese Patent Application No. 200980117320.2.
Office Action dated May 5, 2012 in connection with U.S. Appl. No. 13/253,709.
Supplementary European Search Report dated Feb. 27, 2012 in connection with European Patent Application No. EP 09 84 2865.
"LTE-advanced discussion for RAN2", Panasonic, 3GPP TSG WG2 #65bis, Mar. 17, 2009, 7 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.8.0, Mar. 2009, 157 pages.
Office Action dated Dec. 7, 2012 in connection with U.S. Appl. No. 13/426,263.

RANDOM ACCESS METHOD, EVOLVED NODE B, AND TERMINAL EQUIPMENT

CROSS-REFERENCE TO RELATED APPLICATIONS

This application is a continuation of U.S. patent application Ser. No. 13/426,263, filed on Mar. 21, 2012, which is a continuation of U.S. patent application Ser. No. 13/253,709, filed on Oct. 5, 2011, which is a continuation of International Application No. PCT/CN2009/071200, filed on Apr. 9, 2009, which are hereby incorporated by reference in their entireties.

TECHNICAL FIELD

The present invention relates to the field of communication technologies, and in particular, to a random access method, an evolved Node B (eNB), and a terminal equipment.

BACKGROUND

With the development of wireless communications technologies, in order to satisfy requirements of the International Mobile Telecommunication Advanced (IMT-Advanced) and to support a peak data speed being up to 1G, a Long Term Evolution system currently uses a carrier aggregation technology as a method for expanding a system bandwidth. Carrier aggregation mainly aggregates multiple component carriers into one carrier higher than 20 million hertz (M) to support high data transmission speed.

Currently, an LTE or Long Term Evolution-Advanced (LTE-A) system needs to support asymmetric carrier aggregation. Generally, the number of downlink component carriers is greater than the number of uplink component carriers. For example, a downlink bandwidth of 80 million hertz (MHz) includes four component carriers of 20 MHz. An uplink bandwidth of 20 MHz includes one component carrier of 20 MHz.

In the current LTE system, in a handover process, a non-competitive procedure for a User Equipment (UE) to randomly access a target eNB includes the following steps.

The UE sends a measurement report to a source eNB, and the source eNB selects a target eNB and a target cell for the UE according to the received measurement report or other radio resource information, that is, the source eNB makes a handover decision. Then, the source eNB sends a handover request message to the target eNB. After receiving the handover request message, the target eNB executes admission control and feeds back a handover request acknowledgement message to the source eNB. When receiving the handover request acknowledgement message, the source eNB sends a handover command message to the UE. After the UE receives the handover command message, if the UE receives a dedicated random access preamble allocated by the target eNB to the UE, the UE sends a random access request message to the target eNB through the dedicated random access preamble, that is, the UE executes non-competitive random access; if the UE does not receive the dedicated random access preamble allocated by the target eNB to the UE, the UE executes competitive random access. After receiving the random access preamble sent by the HE, the target eNB sends a random access response message to the UE.

However, the inventor of the present invention finds that, in the foregoing process, when the target eNB includes multiple component carriers, after the target eNB receives the random access request message, the target eNB cannot determine the component carrier which the UE is monitoring, in order to enable the UE to receive the random access response message, the target eNB needs to send the random access response message on all component carriers, thereby resulting in a waste of downlink resources.

SUMMARY

Embodiments of the present invention provide a random access method, an eNB, and a terminal equipment, so that in a random access procedure of cell handover, the eNB is capable of determining a downlink component carrier that a UE monitors, thereby increasing utilization rate of downlink resources.

In order to solve the above technical problems, an embodiment of the present invention provides a random access method, which includes:

determining target component carriers to which a User Equipment (UE) is to be handed over, and notifying the UE of information about the target component carriers through a source eNB; and after receiving a dedicated random access preamble sent by the UE, sending a random access response message on at least one component carrier in the target component carriers.

An embodiment of the present invention further provides a random access method, which includes:

receiving a handover command sent by a source eNB, where the handover command includes information about target component carriers configured by a target eNB or selected by the source eNB, and the target component carriers are carriers to which a User Equipment (UE) is to be handed over; and after sending a dedicated random access preamble to the target eNB, receiving a random access response message on a downlink target carrier in the target component carriers.

Accordingly, an embodiment of the present invention further provides an eNB, which includes:

a determination unit, adapted to determine target component carriers to which a UE is to be handed over;

a notification unit, adapted to notify the UE of information about the target component carriers through a source eNB; and a sending unit, adapted to send a random access response message on at least one component carrier in the target component carriers after a dedicated random access preamble sent by the UE is received.

An embodiment of the present invention provides a terminal equipment, which includes:

a handover command receiving unit, adapted to receive a handover command sent by a source eNB, where the handover command includes information about target component carriers configured by a target eNB or selected by the source eNB, and the target component carriers are carriers to which a UE is to be handed over;

a sending unit, adapted to send a dedicated random access preamble to the target eNB after the handover command receiving unit receives the handover command; and a random response receiving unit, adapted to receive a random access response message on a downlink component carrier in the target component carriers configured for the UE after the sending unit sends the dedicated random access preamble.

It can be known from the foregoing solutions that, in the embodiments of the present invention, the UE learns from the handover command the target component carriers for the target eNB to send the random access response message after receiving the handover command sent by the source eNB, so as to receive, on the downlink target component carrier in the target component carriers, the random access response message sent by the target eNB, thereby reducing power consumption of the UE, and meanwhile, the target eNB further learns the component carriers for sending the random access response message after receiving the dedicated random access preamble sent by the UE, thereby increasing the utilization rate of the downlink resources.

DETAILED DESCRIPTION

Exemplary embodiments of the present invention will be described in detail in the following with reference to the accompanying drawings.

Figure 1:
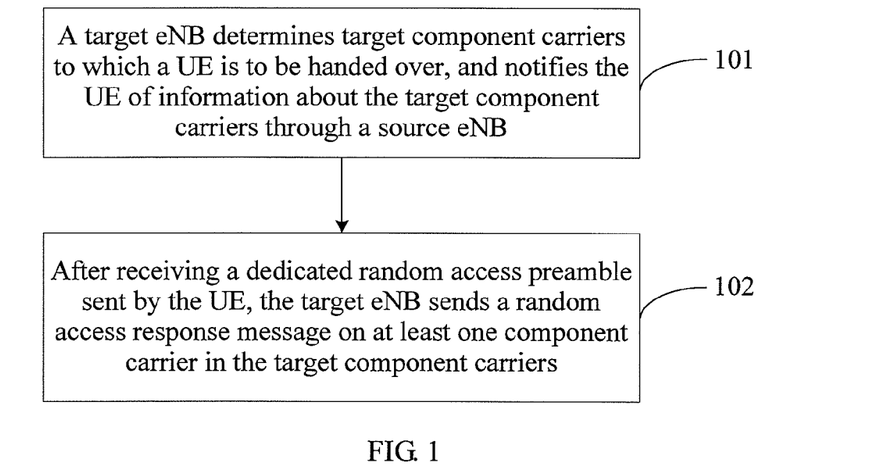
FIG. 1 is a flow chart of a random access method according to an embodiment of the present invention.

Referring to FIG. 1, FIG. 1 is a flow chart of a random access method according to an embodiment of the present invention. The method includes the following steps.

Step 101: A target eNB determines target component carriers to which a UE is to be handed over, and notifies the UE of information about the target component carriers through a source eNB.

Step 102: After receiving a dedicated random access preamble sent by the UE, the target eNB sends a random access response message on at least one component carrier in the target component carriers.

Step 101 specifically includes the following steps.

After receiving a handover request message sent by the source eNB, the target eNB determines the information about the target component carriers to which the UE is to be handed over according to the handover request message, and notifies the source eNB of the information about the target component carriers through a handover request acknowledgement message, and the source eNB sends the target component carriers to the UE through a handover command.

In an exemplary embodiment, the target eNB receives the handover request message sent by the source eNB, where the handover request message includes the UE's capability information about the target component carriers being supported; configures the target component carriers to which the UE is to be handed over according to the handover request message; and then sends the handover request acknowledgement message to the source eNB, where the handover request acknowledgement message includes information about the configured target component carriers, to which the UE is to be handed over.

In another exemplary embodiment, the target eNB receives the handover request message sent by the source eNB, where the handover request message includes the UE's capability information about the target component carriers being supported and the information of the target component carriers selected by the source eNB, and the target component carriers configured are the carriers to which the UE is to be handed over. Then, the target eNB determines whether to allow the target component carriers which are selected by the source eNB and to which the UE is to be handed over; if the target eNB allows the target component carriers which are selected by the source eNB and to which the UE is to be handed over, the target eNB sends the handover request acknowledgement message to the source eNB, where the handover request acknowledgement message includes acknowledgement information of the target component carriers selected by the source eNB, or information about the target component carriers selected by the source eNB, and the target component carriers are the carriers to which the UE is to be handed over; and if the target eNB does not allow the target component carriers which are selected by the source eNB and to which the UE is to be handed over, the target eNB configures the target component carriers to which the UE is to be handed over, and sends the handover request acknowledgement message to the source eNB, where the handover request acknowledgement message includes the information about the target component carriers configured, to which the UE is to be handed over.

In this embodiment, after sending the random access response message, the method may further include the following steps.

After a handover acknowledgement message sent by the UE is received, new uplink and/or downlink component carriers or new component carrier pairs are allocated to the UE.

The sending, by the source eNB, the target component carriers to the UE through the handover command specifically includes: after receiving the handover acknowledgement message sent by the target eNB, sending, by the source eNB, the handover command to the UE, where the handover command includes: the information about the target component carriers configured by the target eNB, or the information about the target component carriers selected by the source eNB, and the target component carriers are the carriers to which the UE is to be handed over.

The handover request acknowledgement message may further include bandwidths of the target component carriers configured by the target eNB, and the target component carriers are the carriers to which the UE is to be handed over. The handover command may further include bandwidths of the target component carriers configured by the target eNB, and the target component carriers are the carriers to which the UE is to be handed over, or bandwidths of the target component carriers selected by the source eNB, and the target component carriers are the carriers to which the UE is to be handed over.

In the embodiment of the present invention, the target component carriers may include, but are not limited to, uplink and/or downlink target component carriers or target component carrier pairs selected by the source eNB or the target eNB for the UE, or an uplink and/or a downlink component carrier or a component carrier pair used to execute random access.

The information about the target component carriers may include, but is not limited to, frequency information, identifiers, or sequence numbers of the uplink and/or downlink target component carriers or the target component carrier pairs, or frequency information, an identifier, or a sequence number of the uplink and/or downlink component carrier or the target component carrier pair used to execute the random access.

Figure 2:
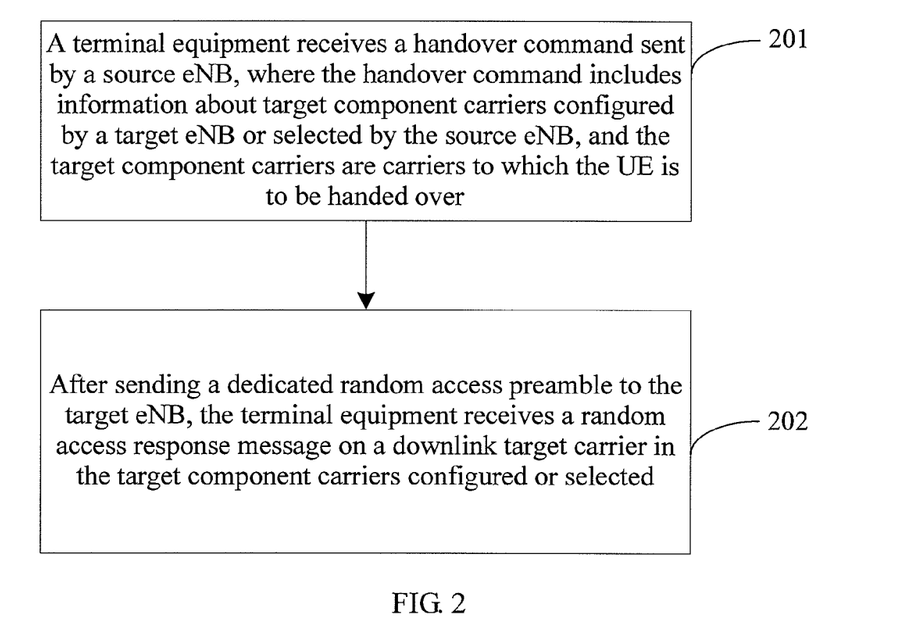
FIG. 2 is a flow chart of another random access method according to an embodiment of the present invention.

Accordingly, an embodiment of the present invention further provides a random access method. FIG. 2 is a flow chart of the random access method. The method includes the following steps.

Step 201: A terminal equipment receives a handover command sent by a source eNB, where the handover command includes information about target component carriers configured by a target eNB, or information about target component carriers selected by the source eNB, and the target component carriers are the carriers to which the UE is to be handed over.

Step 202: After sending a dedicated random access preamble to the target eNB, the terminal equipment receives a random access response message on a downlink target carrier in the target component carriers configured, to which the UE is to be handed over, or on a downlink component carrier in the target component carriers selected, to which the UE is to be handed over.

After receiving the random access response message, the method may further include: after sending a handover acknowledgement message to the target eNB, receiving new uplink and/or downlink target component carriers or new uplink and/or downlink target component carrier pairs allocated by the target eNB to the UE.

The method further includes: receiving a component carrier handover command sent by the target eNB, where the component carrier handover command includes information about component carriers or component carrier pairs re-selected, to which the UE is to be handed over; handing over the UE to the component carriers or the component carrier pairs re-selected; and transmitting data on the component carriers or the component carrier pairs re-selected after handover.

The method further includes: when the component carrier handover command sent by the target eNB is received, receiving a new timing advance command or new timing advance information sent by the target eNB. The transmitting the data on the component carriers or the component carrier pairs after handover further includes: transmitting the data on the component carriers or the component carrier pairs after handover through the new timing advance command or the new timing advance information.

In this embodiment, the component carrier handover command further includes a handover starting time of the component carrier or the component carrier pair.

The information about the component carriers or the component carrier pairs includes: frequency information, identifiers, or sequence number information of the component carriers or the component carrier pairs.

For the convenience of understanding by persons skilled in the art, a specific embodiment is provided in the following for illustration.

Figure 3A:
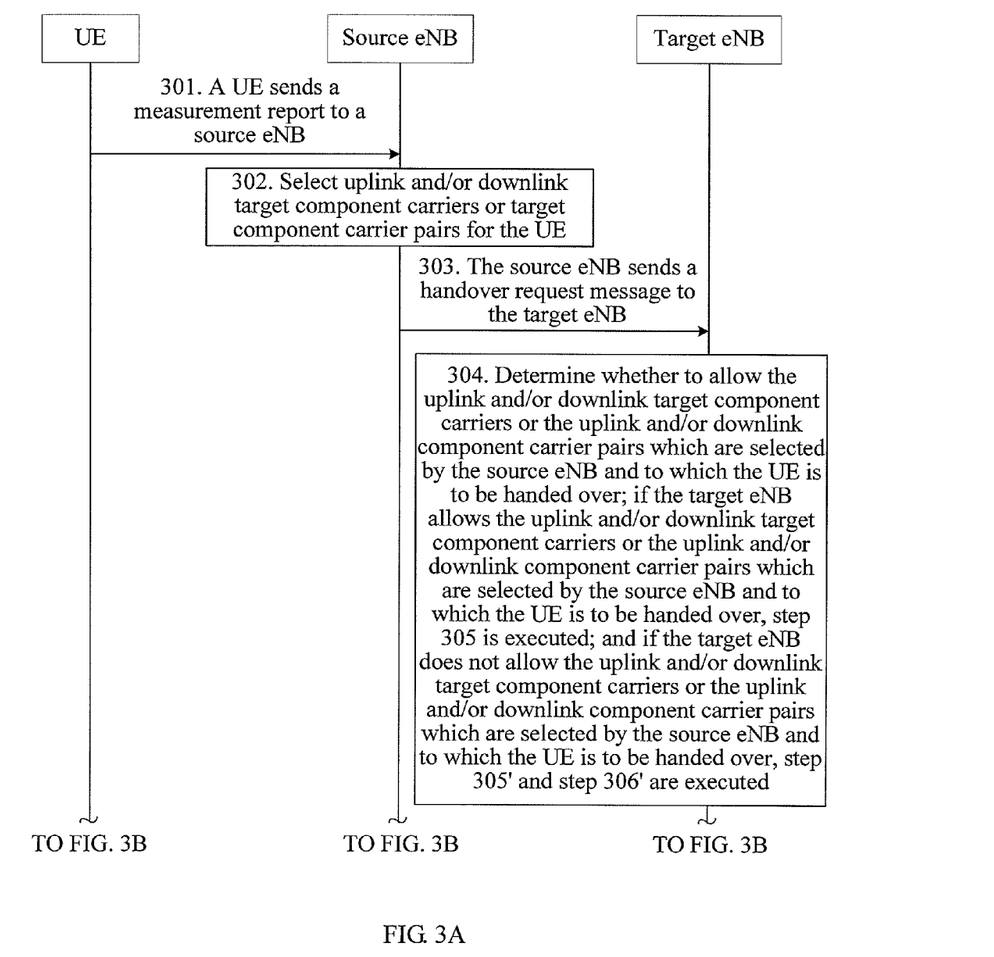
FIG. 3A and FIG. 3B are a specific flow chart of a random access method according to Embodiment 1 of the present invention.
Figure 3B:
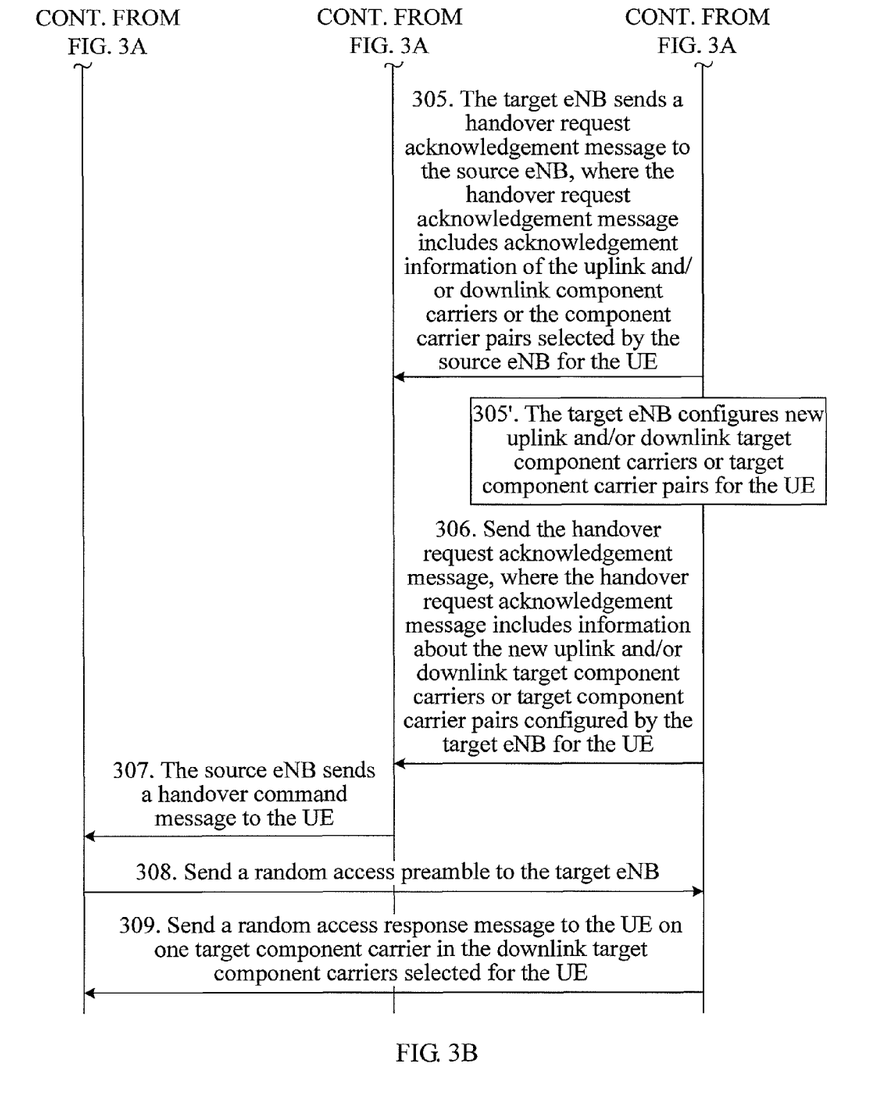

FIG. 3A and FIG. 3B are a specific flow chart of a random access method according to Embodiment 1 of the present invention. Referring to FIG. 3A and FIG. 3B, the method specifically includes the following steps.

Step 301: A UE sends a measurement report to a source eNB.

Specifically, the measurement report may include signal quality information of component carriers of neighbor eNBs, where the signal quality information is measured by the UE.

Step 302: After receiving the measurement report, the source eNB makes a handover decision to select uplink and/or downlink target component carriers or target component carrier pairs for the UE.

After receiving the measurement report, the source eNB makes the handover decision based on the measurement report and other radio resource information. Specifically, the source eNB may decide, according to component carriers being supported by the UE, the uplink and/or downlink target component carriers or the target component carrier pairs used by the UE when the UE accesses a target eNB. That is, the source eNB selects the uplink and/or downlink target component carriers or the target component carrier pairs for the UE based on the measurement report.

Step 303: The source eNB sends a handover request message to the target eNB, where the handover request message includes the UE's capability information about the supported component carriers and information about the target component carriers selected by the source eNB, and the target component carriers are the carriers to which the UE is to be handed over.

That is, the handover request message includes the UE's capability information about the target component carriers being supported and the information about the uplink and/or downlink target component carriers or the target component carrier pairs selected by the source eNB for the UE.

Step 304: After receiving the handover request message, the target eNB determines whether to allow the uplink and/or downlink target component carriers or the uplink and/or downlink component carrier pairs which are selected by the source eNB and to which the UE is to be handed over; if the target eNB allows the uplink and/or downlink target component carriers or the uplink and/or downlink component carrier pairs which are selected by the source eNB and to which the UE is to be handed over, step 305 is executed; and if the target eNB does not allow the uplink and/or downlink target component carriers or the uplink and/or downlink component carrier pairs which are selected by the source eNB and to which the UE is to be handed over, step 305' and step 306 are executed.

Step 305: The target eNB sends a handover request acknowledgement message to the source eNB, where the handover request acknowledgement message includes acknowledgement information of the uplink and/or downlink component carriers or the component carrier pairs selected by the source eNB for the UE, or the handover request acknowledgement message includes the information about the uplink and/or downlink target component carriers or the target component carrier pairs selected by the source eNB for the UE.

Step 305': The target eNB configures new uplink and/or downlink target component carriers or target component carrier pairs for the UE.

Step 306: The target eNB sends the handover request acknowledgement message to the source eNB, where the handover request acknowledgement message includes: information about the new uplink and/or downlink target component carriers or target component carrier pairs configured by the target eNB for the UE.

The target eNB may further include bandwidths of the new uplink and/or downlink target component carriers or target component carrier pairs selected for the UE, where the bandwidths are included in the handover request acknowledgement message. The embodiment of the present invention is not limited thereto.

Step 307: The source eNB sends a handover command message to the UE.

If the target eNB accepts the uplink and/or downlink target component carriers or the target component carrier pairs selected by the source eNB for the UE, the handover command includes the information about the uplink and/or downlink target component carriers or the target component carrier pairs selected by the source eNB for the UE. The handover command may further include bandwidth information of the selected uplink and/or downlink target component carriers or target component carrier pairs.

If the target eNB cannot allow all or a part of the uplink and/or downlink target component carriers or the target component carrier pairs selected by the source eNB for the UE, the handover command includes the information about the uplink and/or downlink target component carriers or the target component carrier pairs selected by the target eNB for the UE. The handover command may further include the bandwidth information of the selected uplink and/or downlink target component carriers or target component carrier pairs.

Step 308: After receiving the handover command, the UE sends a random access preamble to the target eNB, where the handover command includes the information about the uplink and/or downlink target component carriers or the target component carrier pairs selected for the UE. The handover command may further include the bandwidth information of the selected uplink and/or downlink target component carriers or target component carrier pairs.

That is, after the handover command is received, a process for synchronizing with a target cell is executed to access the target cell. The UE monitors the uplink and/or downlink target component carriers or the target component carrier pairs according to the information about the allocated uplink and/or downlink target component carriers or target component carrier pairs, where the information is in the handover command.

Step 309: After receiving the preamble sent by the UE, the target eNB sends a random access response message to the UE on one target component carrier in the downlink target component carriers selected for the UE.

In this embodiment, the information about the target component carriers specifically includes the uplink and/or downlink target component carriers or the target component carrier pairs selected by the source eNB for the UE, or frequency information, identifiers, or sequence numbers of the uplink and/or downlink target component carriers or the target component carrier pairs, but the embodiment is not limited thereto.

Figure 4A:
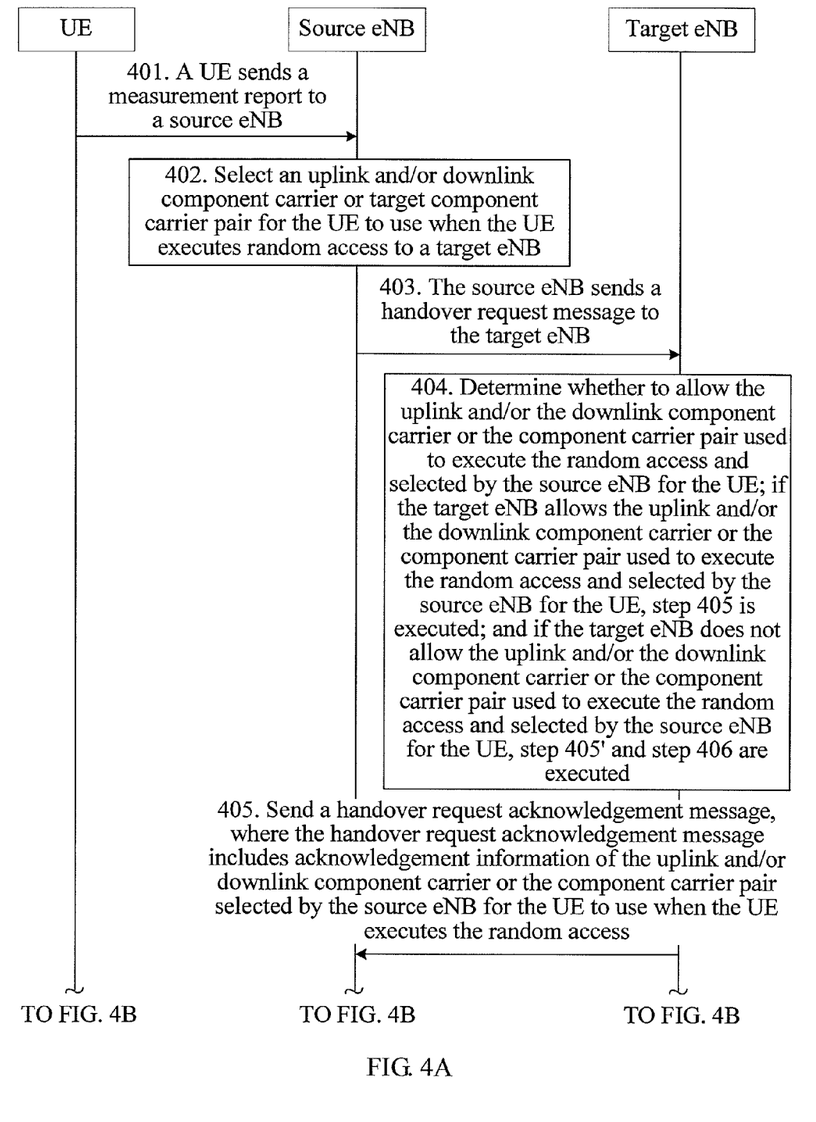
FIG. 4A and FIG. 4B are a specific flow chart of a random access method according to Embodiment 2 of the present invention.
Figure 4B:
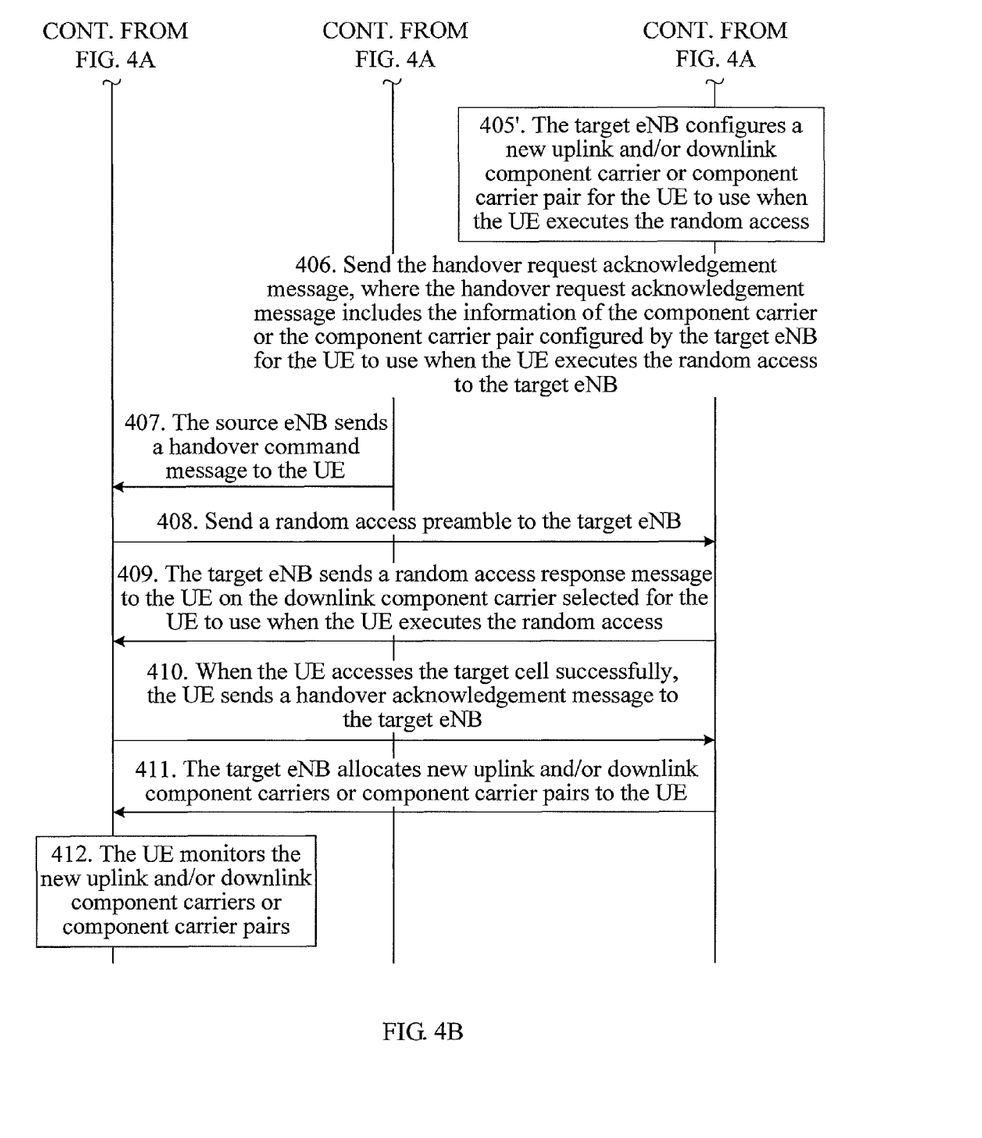

FIG. 4A and FIG. 4B are a specific flowchart of a random access method according to Embodiment 2 of the present invention. The method specifically includes the following steps.

Step 401: A UE sends a measurement report to a source eNB. Specifically, the measurement report may include signal quality information of component carriers of neighbor eNBs, where the signal quality information is measured by the UE.

Step 402: The source eNB makes a handover decision to select an uplink and/or a downlink component carrier or target component carrier pair for the UE to use when the UE executes a random access to a target eNB.

That is, the source eNB makes the handover decision based on the measurement report sent by the UE and other radio resource information. That is, the source eNB may select, according to the component carriers being supported by the UE, the uplink and/or the downlink component carrier or the target component carrier pair for the UE to use when the UE executes the random access to the target eNB.

Step 403: The source eNB sends a handover request message to the target eNB, where the handover request message includes the UE's capability information about the supported component carriers, and/or information about the component carriers or the target component carrier pairs selected by the source eNB for the UE to use when the UE executes the random access to the target eNB.

Step 404: After receiving the handover request message, the target eNB determines whether to allow the uplink and/or the downlink component carrier or the component carrier pair used to execute the random access and selected by the source eNB for the UE; if the target eNB allows the uplink and/or downlink component carrier or the component carrier pair used to execute the random access and selected by the source eNB for the UE, step 405 is executed; and if the target eNB does not allow the uplink and/or downlink component carrier or the component carrier pair used to execute the random access and selected by the source eNB for the UE, step 405' and step 406 are executed.

Step 405: The target eNB sends a handover request acknowledgement message to the source eNB, where the handover request acknowledgement message includes acknowledgement information of the uplink and/or downlink component carrier or the component carrier pair selected by the source eNB for the UE to use when the UE executes the random access. Alternatively, the handover request acknowledgement message includes information about the uplink and/or downlink component carriers or the component carrier pairs selected by the source eNB for the UE to use when the UE executes the random access to the target eNB.

Step 405': The target eNB configures a new uplink and/or downlink component carrier or component carrier pair for the UE to use when the UE executes the random access.

Step 406: The target eNB sends the handover request acknowledgement message to the source eNB, where the handover request acknowledgement message includes information about the component carrier or the component carrier pair configured by the target eNB for the UE to use when the UE executes the random access to the target eNB.

Furthermore, the target eNB may further include bandwidths of the uplink and/or downlink component carriers or the component carrier pairs selected for the UE to use when the UE executes the random access to the target eNB, where the bandwidths are included in the handover request acknowledgement message.

Step 407: After receiving the handover request acknowledgement message, the source eNB sends a handover command message to the UE.

If the target eNB accepts the uplink and/or downlink component carriers or component carrier pairs selected by the source eNB for the UE to use when the UE executes the random access to the target eNB, the handover command includes the information about the uplink and/or downlink component carriers or component carrier pairs selected by the source eNB for the UE to use when the UE executes the random access to the target eNB. Furthermore, the handover command may further include bandwidth information of the selected uplink and/or downlink component carriers or component carrier pairs.

If the target eNB cannot allow all or a part of the uplink and/or downlink component carriers or component carrier pairs selected by the source eNB for the UE to use when the UE executes the random access to the target eNB, the handover command includes the information about the uplink and/or downlink component carriers or component carrier pairs determined by the target eNB for the UE to use when the UE executes the random access to the target eNB. Furthermore, the handover command may further include the bandwidth information of the selected uplink and/or downlink component carriers or component carrier pairs used to execute the random access to the target eNB.

Step 408: After receiving the handover command, the UE sends a random access preamble to the target eNB, where the handover command includes the information about the uplink and/or downlink component carriers or the component carrier pairs selected for the UE. Furthermore, the handover command may further include the bandwidth information of the selected uplink and/or downlink component carriers or component carrier pairs.

That is, after receiving the handover command, the UE executes a process for synchronizing with a target cell to access the target cell. The UE monitors the downlink component carriers or the component carrier pairs according to the information about the allocated uplink and/or downlink component carriers or the component carrier pairs used to execute the random access to the target eNB, where the information is in the handover command. The UE sends the random access preamble to the target eNB.

Step 409: After receiving the preamble sent by the UE, the target eNB sends a random access response message to the UE on the downlink component carrier selected for the UE to use when the UE executes the random access.

The handover response message may include information about uplink and/or downlink component carriers or component carrier pairs capable of being newly allocated by the target eNB to the UE.

Step 410: When the UE accesses the target cell successfully, the UE sends a handover acknowledgement message to the target eNB.

Step 411: After receiving the handover acknowledgement message sent by the UE, the target eNB allocates new uplink and/or downlink component carriers or component carrier pairs to the UE.

Here, the information about the uplink and/or downlink component carriers or the component carrier pairs newly allocated to the UE may be sent to the UE in a form of a Medium Access Control (MAC) Protocol Data Unit (PDU), or a physical layer control channel (PCCH) or Radio Resource Control (RRC) message, or other messages, which is not limited by the embodiment of the present invention.

Step 412: After receiving the information about the newly allocated uplink and/or downlink component carriers or component carrier pairs, the UE monitors the new uplink and/or downlink component carriers or component carrier pairs.

Embodiments of the present invention further provide exemplary Embodiment 3. An implementation process in this embodiment is similar to that in FIG. 3A and FIG. 3B or FIG. 4A and FIG. 4B. Differences lie in step 302 to step 304 in FIG. 3A and FIG. 3B or step 402 to step 404 in FIG. 4A and FIG. 4B, which are modified respectively as follows.

Step 302 (or step 402): The source eNB makes a handover decision to select a target eNB and a target cell for the UE.

Step 303 (or step 403): The source eNB sends a handover request message to the target eNB, where the handover request message includes the UE's capability information about the supported component carriers.

Step 304 (or step 404): After receiving the handover request message, the target eNB executes admission control. If the target eNB allows the UE to access the target eNB, the target eNB configures new uplink and/or downlink target component carriers or target component carrier pairs for the UE.

Step 305 (or step 405): After receiving the handover request message, the target eNB executes the admission control. If the target eNB allows the UE to access the target eNB, the target eNB configures an uplink and/or a downlink component carrier or a component carrier pair for the UE to use when the UE executes random access.

That is, in this embodiment, after the target eNB receives the handover request message, if the target eNB allows the UE to access the target eNB, the target eNB configures the new uplink and/or downlink target component carriers or target component carrier pairs for the UE, or the target eNB configures the uplink and/or downlink component carrier or component carrier pair used to execute the random access for the UE; and then the target eNB sends a configuration result to the source eNB through a handover request acknowledgement message. Subsequent execution steps, that is, step 307 to step 309 are the same as those in FIG. 3A and FIG. 3B or step 407 to step 412 are the same as those in FIG. 4A and FIG. 4B. For details, reference may be made to the foregoing description, and the details will not be described herein again.

In this embodiment, the information about the target component carriers specifically includes frequency information, an identifier, or a sequence number of the uplink and/or downlink component carrier or the component carrier pair selected by the source eNB for the UE to use when the UE executes the random access, or frequency information, an identifier, or a sequence number of the uplink and/or downlink component carrier or the target component carrier pair used to execute the random access.

That is, if the handover request message includes the UE's capability information about the target component carriers being supported, the target eNB configures the target component carriers to which the UE is to be handed over according to the handover request message; and then the target eNB sends a handover request acknowledgement message to the source eNB, where the handover request acknowledgement message includes the information about the target component carriers configured, to which the UE is to be handed over.

Other implementation processes in this embodiment are similar to the corresponding processes in the foregoing embodiment and will not be described herein again.

In Embodiment 1 to Embodiment 3, the UE may need to be handed over between the component carriers in the communication process before and after cell handover. Specifically, the handover of the UE between the component carriers at the source eNB or at a new serving eNB (a target eNB before the handover is completed) is described in the following embodiment. Particularly, in Embodiment 2, when the target eNB allocates the new uplink and/or downlink component carriers or component carrier pairs for the UE after receiving the handover acknowledgement message sent by the UE, and when the UE and the target eNB transmit data on the newly allocated uplink and/or downlink component carriers or the component carrier pairs, if the target eNB can re-allocate new uplink and/or downlink component carriers or component carrier pairs for the UE according to needs (for example, the allocated component carriers are insufficient or redundant or a better component carrier exists, but the embodiment is not limited thereto). Based on the foregoing embodiment, the method may further include the following steps.

The target eNB sends a component carrier handover command to the UE, where the component carrier handover command includes information about component carriers or component carrier pairs re-selected, to which the UE is to be handed over.

After handover, the target eNB and the UE transmit the data on the component carriers or the component carrier pairs. In the subsequent transmission process, the target eNB may perform component carrier handover according to needs. A specific implementation process may be implemented through any embodiment in FIG. 5 to FIG. 7.

In the embodiment of the present invention, the handover acknowledgement message is further referred to as an RRC (Radio Resource Control) connection reconfiguration complete message.

Figure 5:
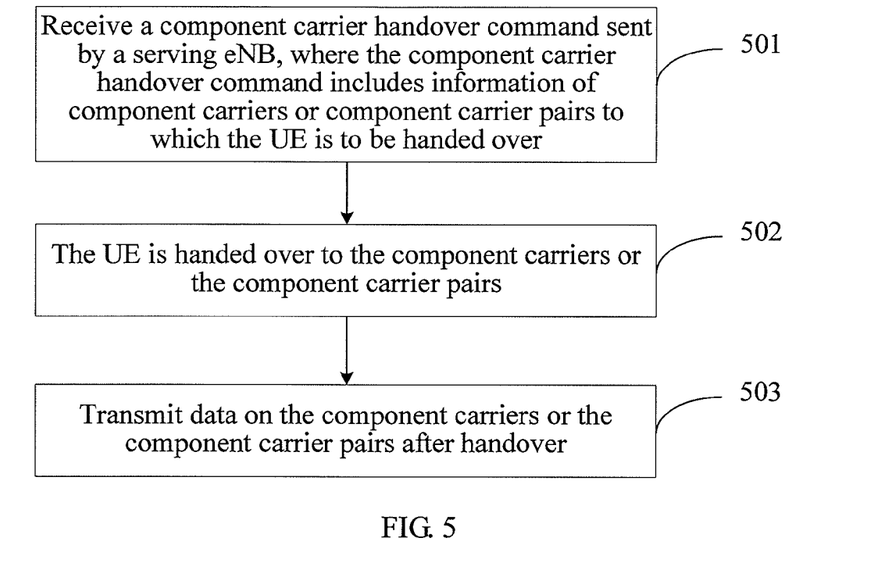
FIG. 5 is a flow chart of a component carrier handover method according to an embodiment of the present invention.

Accordingly, an embodiment of the present invention further provides a component carrier handover method. FIG. 5 is a flow chart of the component carrier handover method. The method includes the following steps.

Step 501: Receive a component carrier handover command sent by a serving eNB, where the component carrier handover command includes information about component carriers or component carrier pairs to which the UE is to be handed over.

The serving eNB may be a source eNB of the UE before cell handover is performed or may be an eNB of the UE after the cell handover is performed, that is, a target eNB during the handover.

Step 502: The UE is handed over to the component carriers or the component carrier pairs.

Step 503: Transmit data on the component carriers or the component carrier pairs after handover.

The method may further include receiving a new timing advance command or new timing advance information sent by the serving eNB when receiving the component carrier handover command sent by the serving eNB.

The transmitting the data on the component carriers or the component carrier pairs after handover further includes transmitting, through the new timing advance command or the new timing advance information, the data on the component carriers or the component carrier pairs after handover.

The information about the component carriers or the component carrier pairs includes: frequency information, identifiers, or sequence number information of the component carriers or the component carrier pairs.

The method may further include: sending a component carrier handover acknowledgement message to the serving eNB.

The component carrier handover command further includes a handover starting time of the component carrier or the component carrier pair.

In this embodiment, the component carriers specifically include an uplink component carrier and a downlink component carrier, and the component carrier pair specifically includes an uplink/a downlink component carrier pair.

In a handover process of the component carrier handover, in uplink component carrier handover, data not yet transmitted successfully on an original uplink component carrier before the handover is transmitted to the serving eNB on a new component carrier after the handover or on a component carrier that does not undergo the handover; in downlink component carrier handover, data not yet transmitted successfully on an original downlink component carrier before the handover is transmitted to the UE on a new component carrier after the handover or on a component carrier that does not undergo the handover; and in uplink/downlink component carrier pair handover, data not yet transmitted successfully on an original uplink/downlink component carrier pairs before the handover is transmitted to the UE or the serving eNB on a new component carrier pair after the handover or on a component carrier pair that does not undergo the handover.

The component carrier handover command may adopt an MAC layer message, a physical layer message, or an RRC layer message.

In this embodiment, the component carrier handover command sent by the serving eNB is received to re-select the component carrier or the component carrier pair to which the UE is to be handed over, so that the terminal may receive a random access response message on the re-selected component carrier or component carrier pair.

Figure 6:
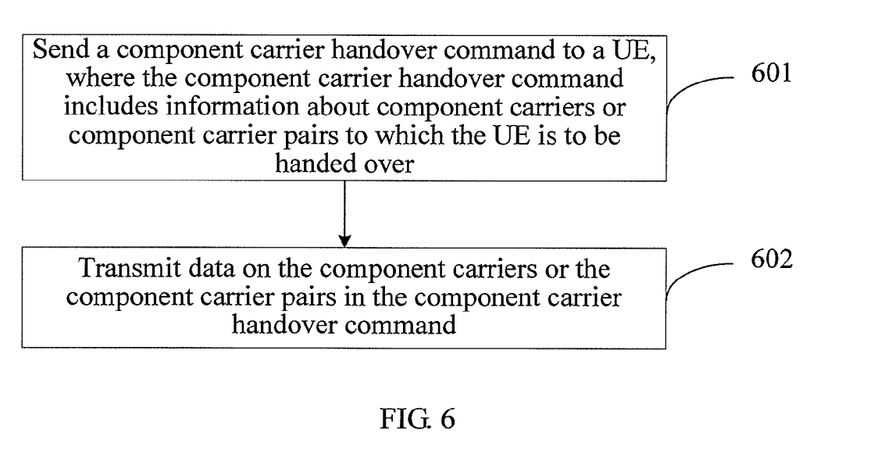
FIG. 6 is a flow chart of another component carrier handover method according to an embodiment of the present invention.

Accordingly, an embodiment of the present invention further provides a component carrier handover method. FIG. 6 is a flow chart of the component carrier handover method. The method includes the following steps.

Step 601: Send a component carrier handover command to a UE, where the component carrier handover command includes information about component carriers or component carrier pairs to which the UE is to be handed over.

Step 602: Transmit data on the component carriers or the component carrier pairs in the component carrier handover command.

The method further includes receiving a component carrier handover acknowledgement message sent by the UE.

In this embodiment, the component carrier handover command is sent to the UE, so that the UE may transmit the data on the re-selected component carriers or component carrier pair and implement a random access procedure.

Figure 7:
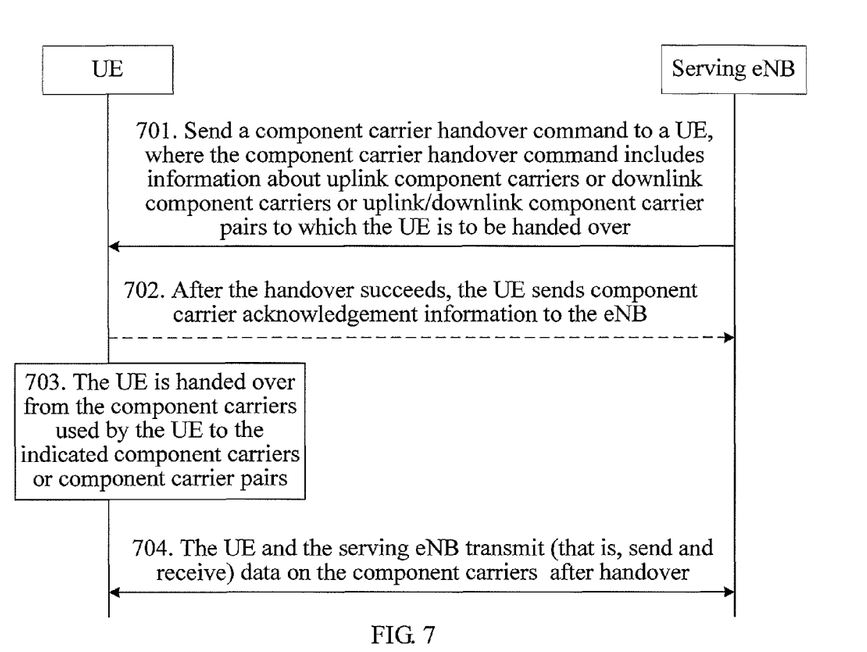
FIG. 7 is a specific flow chart of a component carrier handover method according to Embodiment 4 of the present invention.

For specific implementation processes in FIG. 5 and FIG. 6, reference may be made to FIG. 7.

FIG. 7 is a specific flowchart of a component carrier handover method according to Embodiment 4 of the present invention. Referring to FIG. 7, the method includes the following steps.

Step 701: A serving eNB sends a component carrier handover command to a UE, where the component carrier handover command includes information about uplink component carriers or downlink component carriers or uplink/downlink component carrier pairs to which the UE is to be handed over, and the information may be frequency information, identifiers, or sequence number information of the component carriers or the component carrier pairs.

The component carrier handover command may be in the form of an MAC layer message, a physical layer message, or an RRC message. For example, an Information Element (IE) or an MAC PDU may be added in an RRC connection configuration message. Moreover, a PCCH may further be adopted to instruct the UE to perform rapid component carrier handover. That is, an eNB may employ a Physical Downlink Control Channel (PDCCH) (that is, the PDCCH includes the information about the uplink component carriers or the downlink component carriers or the uplink/downlink component carrier pairs to which the UE is to be handed over) to notify the UE of the target component carriers to which the UE is to be handed over. Moreover, the component carrier handover command shall include information about starting time of the handover for the component carrier or the component carrier pair, that is, a handover starting time of the component carrier or the component carrier pair, to ensure synchronization between the UE and the eNB.

Optionally, the eNB may further send a Timing Advance Command MAC control element or timing advance information to the UE at the time of sending the component carrier handover command, or send the component carrier handover command carrying the timing advance information to the UE, which is not limited by the embodiment of the present invention.

Step 702: After the handover succeeds, the UE sends component carrier acknowledgement information to the eNB to indicate agreeing to be handed over to the indicated component carriers to work. This step is optional.

Step 703: After receiving the component carrier handover command sent by a serving eNB, the component carriers used by the UE is handed over to the indicated component carriers or component carrier pairs.

Step 704: The UE and the serving eNB transmit (that is, send and receive) data on the component carriers after handover. Specifically, when receiving the timing advance information sent by the eNB, the UE adopts the new timing advance information when sending or receiving the data on the component carriers.

Optionally, before the handover moment of the component carriers or the component carrier pair arrives, the UE may further send component carrier acknowledgement information to the eNB to indicate agreeing to be handed over to the indicated component carriers or component carrier pair to work.

In the handover process in this embodiment, user plane data processing includes the following three situations.

(1) In downlink component carrier handover, data not yet transmitted successfully to the UE (including data not yet transmitted by the eNB to the UE and data not yet correctly received and acknowledged by the UE before handover) on a replaced serving component carrier (that is, an original serving component carrier) during the handover is transmitted or retransmitted to the UE on a component carrier that does not undergo the handover or on a new component carrier after the handover.

(2) In uplink component carrier handover, data not yet transmitted successfully to the eNB (including data not yet transmitted by the UE to the eNB and data not correctly received and acknowledged by the eNB before handover) on a replaced serving component carrier during the handover is transmitted or retransmitted to the eNB on a component carrier that does not undergo the handover or on a new component carrier after the handover.

(3) In uplink and downlink component carriers/component carrier pair handover, data not yet transmitted successfully (data not yet transmitted by the UE to the eNB and data not correctly received and acknowledged by the eNB before handover and data not transmitted by the eNB to the UE and data not correctly received and acknowledged by the UE before handover) on replaced serving component carriers/a component carrier pair during the handover is transmitted or retransmitted on the component carrier that does not undergo the handover or on the new component carrier after the handover.

Figure 8:
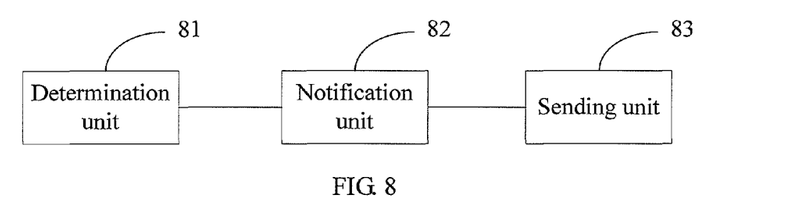
FIG. 8 is a schematic structure diagram of an eNB according to an embodiment of the present invention.

Based on the implementation process of the foregoing method, an embodiment of the present invention further provides an eNB. FIG. 8 is a schematic structure diagram of the eNB. The eNB includes a determination unit 81, a notification unit 82, and a sending unit 83. The determination unit 81 is adapted to determine information of the target component carriers to which the UE is to be handed over. The notification unit 82 is adapted to notify the UE of the information about the target component carriers through a source eNB. The sending unit 83 is adapted to send a random access response message on at least one component carrier in the target component carriers after a dedicated random access preamble sent by the UE is received.

The determination unit includes a message receiving unit and a component carrier determination unit. The message receiving unit is adapted to receive a handover request message sent by the source eNB. The component carrier determination unit is adapted to determine, according to the handover request message, the target component carriers to which the UE is to be handed over, after the message receiving unit receives the handover request message. The notification unit 82 is specifically adapted to notify, through a handover request acknowledgement message, the source eNB of the information about the target component carriers determined by the component carrier determination unit after the component carrier determination unit determines the target component carriers to which the UE is to be handed over, so that the source eNB sends the target component carriers to the UE through a handover command.

A specific implementation process is as follows.

The message receiving unit receives the handover request message sent by the source eNB, where the handover request message includes the UE's capability information about the target component carriers being supported; the component carrier determination unit configures, according to the handover request message, the target component carriers to which the UE is to be handed over; and the notification unit sends the handover request acknowledgement message to the source eNB after the component carrier determination unit determines the information about the target component carriers to which the UE is to be handed over, where the handover request acknowledgement message includes information about the target component carriers configured, to which the UE is to be handed over. After the handover request acknowledgement message is sent, the message receiving unit instructs the sending unit to send the random access response message on at least one component carrier in the target component carriers after receiving the dedicated random access preamble sent by the UE.

Another specific implementation process is as follows. The determination unit may further include a massage receiving unit, a judgment unit, and a component carrier determination unit.

The massage receiving unit receives a handover request message sent by the source eNB, where the handover request message includes the UE's capability information about the target component carriers being supported and information about the target component carriers selected by the source eNB, and the target component carriers are the carriers to which the UE is to be handed over.

The judgment unit determines, according to the handover request message received by the massage receiving unit, whether to allow the target component carriers which are selected by the source eNB and to which the UE is to be handed over, and sends a determination result, that is, sends an allowance determination result to the notification unit directly and sends a non-allowance determination result to the component carrier determination unit.

When receiving the allowance determination result, the notification unit sends a handover request acknowledgement message to the source eNB, where the handover request acknowledgement message includes acknowledgement information of the target component carriers selected by the source eNB, or the information about the target component carriers selected by the source eNB, and the target component carriers are the carriers to which the UE is to be handed over.

When receiving the non-allowance determination result, the component carrier determination unit configures, according to the UE's capability information about the target component carriers being supported, the target component carriers to which the UE is to be handed over, and sends a handover request acknowledgement message to the source eNB, where the handover request acknowledgement message includes information about the target component carriers configured, to which the UE is to be handed over. After the handover request acknowledgement message is sent, the message receiving unit instructs the sending unit to send the random access response message on at least one component carrier in the target component carriers after receiving the dedicated random access preamble sent by the UE.

In this embodiment, after sending the random access response message, the method further includes: after receiving the handover acknowledgement message sent by the UE, allocating new uplink and/or downlink component carriers or new component carrier pairs to the UE.

It should be noted that, in the embodiment of the present invention, the information of the target component carriers may include, but are not limited to, uplink and/or downlink target component carriers or target component carrier pairs selected by the source eNB for the UE; or an uplink and/or a downlink component carrier or a component carrier pair used to execute random access; or frequency information, identifiers or sequence numbers of the uplink and/or downlink target component carriers or the target component carrier pairs, or frequency information, an identifier or a sequence number of the uplink and/or downlink component carrier or the target component carrier pair used to execute the random access.

For details of an implementation process of functions and effects of units in the eNB, reference may be made to the implementation process of the foregoing method, and the details will not be described herein again.

Figure 9:
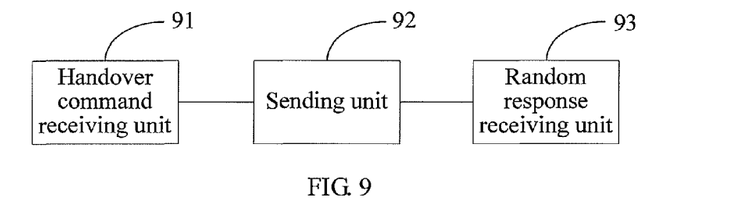
FIG. 9 is a schematic structure diagram of a terminal equipment according to an embodiment of the present invention.

Accordingly, an embodiment of the present invention further provides a terminal equipment. FIG. 9 is a schematic structure diagram of the terminal equipment. The terminal equipment includes: a handover command receiving unit 91, a sending unit 92, and a random response receiving unit 93. The handover command receiving unit 91 is adapted to receive a handover command sent by a source eNB, where the handover command includes information about target component carriers configured by a target eNB, or information about target component carriers selected by the source eNB, and the target component carriers are the carriers to which the UE is to be handed over. The sending unit 92 is adapted to send a dedicated random access preamble to the target eNB after the handover command receiving unit receives the handover command. The random response receiving unit 93 is adapted to receive a random access response message on a downlink target carrier in the target component carriers configured for the UE or a downlink component carrier in the target component carriers selected by the source eNB, and the target component carriers are the carriers to which the UE is to be handed over, after the sending unit sends the dedicated random access preamble.

After the random response receiving unit receives the random access response message, the terminal equipment may further include a component carrier receiving unit.

The component carrier receiving unit is adapted to receive new uplink and/or downlink target component carriers or new uplink and/or downlink target component carrier pairs allocated by the target eNB for the UE, after a handover acknowledgement message is sent to the target eNB.

The terminal equipment further includes a monitoring unit, adapted to monitor the target component carriers selected by the source eNB, and the target component carriers are the carriers to which the UE is to be handed over, or adapted to monitor the target component carriers configured, according to the UE's capability information about the supported component carriers, by the target eNB, and the target component carriers are the carriers to which the UE is to be handed over, which are indicated in the handover command, after the handover command receiving unit receives the handover command.

For details of an implementation process of functions and effects of units in the eNB, reference may be made to the implementation process of the foregoing method, and the details will not be described herein again.

Figure 10:
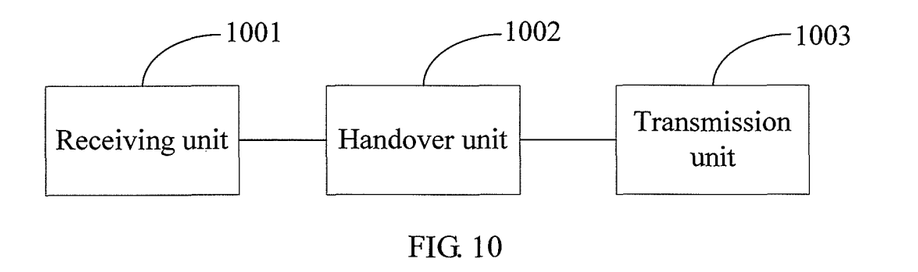
FIG. 10 is a schematic structure diagram of another terminal equipment according to an embodiment of the present invention.

Accordingly, an embodiment of the present invention further provides a terminal equipment. FIG. 10 is a schematic structure diagram of the terminal equipment. The terminal equipment includes: a receiving unit 1001, a handover unit 1002, and a transmission unit 1003. The receiving unit 1001 is adapted to receive a component carrier handover command sent by a serving eNB, where the component carrier handover command includes information about component carriers or component carrier pairs to which the UE is to be handed over. The handover unit 1002 is adapted to hand over the UE to the component carriers or the component carrier pairs, after the receiving unit 1001 receives the handover command. The transmission unit 1003 is adapted to transmit data on the component carriers or the component carrier pairs after handover, after the handover unit 1002 successfully performs the handover.

The receiving unit 1001 is further adapted to receive a new timing advance command or new timing advance information sent by the serving eNB when receiving the component carrier handover command. The transmission unit 1003 is further adapted to transmit, through the new timing advance command or the new timing advance information, the data on the component carriers or the component carrier pairs after handover.

The terminal equipment further includes a sending unit, adapted to send a component carrier handover acknowledgement message to the serving eNB after the handover unit successfully performs the handover.

For details of an implementation process of functions and effects of units in the terminal equipment, reference may be made to the implementation process of the foregoing method, and the details will not be described herein again.

Figure 11:
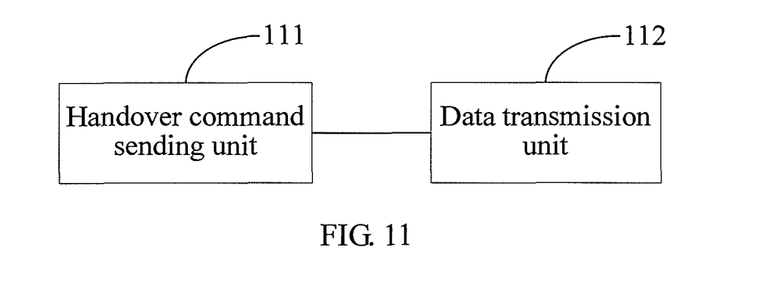
FIG. 11 is a schematic structure diagram of another eNB according to an embodiment of the present invention.

Accordingly, an embodiment of the present invention further provides an eNB. FIG. 11 is a schematic structure diagram of the eNB. The eNB includes a handover command sending unit ill and a data transmission unit 112. The handover command sending unit 111 is adapted to send a component carrier handover command to a UE, where the handover command includes information about component carriers or component carrier pairs to which the UE is to be handed over. The data transmission unit 112 is adapted to transmit data on the component carriers or the component carrier pairs after the handover command sending unit 111 sends the handover command.

The eNB further includes a receiving unit, adapted to receive a component carrier handover acknowledgement message sent by the UE, after the handover command sending unit sends the handover command.

For details of an implementation process of functions and effects of units in the eNB, reference may be made to the implementation process of the foregoing method, and the details will not be described herein again.

It can be seen that, in the embodiment of the present invention, when the source eNB decides to perform the handover, the source eNB sends the handover request message to the target eNB, where the handover request message includes: the UE's capability information about the target component carriers being supported, or the UE's capability information about the target component carriers being supported and the information about the target component carriers selected by the source eNB, and the target component carriers are the carriers to which the UE is to be handed over. After the target eNB receives the handover request, two situations occur. One is that the target eNB agrees with the information about the target component carriers selected by the source eNB, and the target component carriers are the carriers to which the UE is to be handed over, and sends a handover request acknowledgement message indicating agreement to the source eNB; the other is that: after receiving the handover request, the target eNB configures, according to the UE's capability information about the target component carriers being supported, the target component carriers, to which the UE is to be handed over, and sends the configuration result to the source eNB through the handover request acknowledgement message. After receiving the handover request acknowledgement message, the source eNB sends the handover command to the UE, where the handover command includes the target component carriers configured by the target eNB, or the target component carriers selected by the source eNB, and the target component carriers are the carriers to which the UE is to be handed over. After receiving the handover command, the UE monitors the target component carriers in the handover command, and after sending the dedicated random access preamble to the target eNB, receives the random access response message on at least one target component carrier in the target component carriers which are monitored. Similarly, after receiving the dedicated random access preamble sent by the UE, the target eNB sends the random access response message on at least one component carrier in the target component carriers. It can be seen that: after receiving the handover command, the UE learns the component carriers that are used for the target eNB to send the random access response message, so as to receive the random access response message on the component carriers, thereby reducing power consumption of the UE; and meanwhile, after receiving the dedicated random access preamble, the target eNB learns the component carriers that are used for sending the random access response message, thereby increasing utilization rate of downlink resources. Similarly, after receiving the handover command, the UE learns the information about the component carriers or the component carrier pairs, to which the UE is to be handed over, is handed over to the component carriers or the component carrier pairs, and transmits the data on the component carriers or the component carrier pairs after handover, thereby reducing the power consumption of the UE, and meanwhile, the serving eNB transmits the data on the component carriers or the component carrier pairs after sending the handover command, thereby increasing the utilization rate of downlink resources.

Through the above description of the implementation, persons skilled in the art may clearly understand that the present invention may be implemented through software plus a necessary universal hardware platform, and definitely may also be implemented through hardware. But in many cases, the former is preferred. Based on this understanding, the technical solutions or the part that makes contributions to the prior art may be substantially embodied in the form of a software product. The computer software product may be stored in a storage medium such as a Read Only memory (ROM)/Random Access Memory (RAM), a magnetic disk, or an optical disk, and contain several instructions to instruct computer equipment (for example, a personal computer, a server, or network equipment) to perform the methods described in the embodiments of the present invention or in some parts of the embodiments of the present invention.

The above descriptions are merely exemplary embodiments of the present invention. It should be noted that persons of ordinary skill in the art may make modifications and improvements without departing from the principle of the present invention, which should be construed as falling within the protection scope of the present invention.

What is claimed is:
1. A random access method, comprising:
determining at least one target component carrier to which a User Equipment (UE) is to be handed over;
notifying a source evolved Node B (eNB) of information about the at least one target component carrier so that the source eNB forwards the information to the UE;
receiving a dedicated random access preamble sent by the UE;
sending a random access response message on at least one component carrier in the at least one target component carrier; and
after receiving a handover acknowledgement message sent by the UE, allocating at least one new uplink component carrier.

2. The method according to claim 1, further comprising:
sending a component carrier handover command to the UE, wherein the component carrier handover command comprises information about at least one new component carrier re-selected for the UE by a target eNB and to which the UE is to be handed over; and
transmitting data on the at least one the new component carrier re-selected for the UE after completing the component carrier handover.

3. The method according to claim 1, wherein
the information about the at least one target component carrier allocated comprises: frequency information, an identifier, or a sequence number of the at least one target component carrier.

4. A random access method, comprising:
receiving a handover command sent by a source evolved Node B (eNB), wherein the handover command comprises information about at least one target component carrier configured by a target eNB or selected by the source eNB, and the at least one target component carrier is a carrier to which a User Equipment (UE) is to be handed over;
sending a dedicated random access preamble to the target eNB;
receiving a random access response message on at least one downlink target carrier in the at least one target component carrier;
sending a handover acknowledgement message to the target eNB; and
receiving at least one new target component carrier allocated by the target eNB for the UE.

5. The method according to claim 4, further comprising:
receiving a component carrier handover command sent by the target eNB, wherein the component carrier handover command comprises information about at least one new component carrier re-selected and to which the UE is to be handed over;
handing over the UE to the at least one new component carrier re-selected; and
transmitting data on the at least one new component carrier re-selected after handover.

6. The method according to claim 5, further comprising:
when receiving the component carrier handover command sent by the target eNB, receiving a new timing advance command or new timing advance information sent by the target eNB, wherein
transmitting the data on the at least one new component carrier re-selected after handover further comprises:
transmitting the data on the at least one new component carrier re-selected after handover through the new timing advance command or the new timing advance information; and
the component carrier handover command further comprises a handover starting time of the at least one new component carrier re-selected.

7. An evolved Node B (eNB) including multiple component carriers, the eNB comprising:
   a determination unit, configured to determine at least one target component carrier to which a User Equipment (UE) is to be handed over;
   a notification unit, configured to notify a source evolved Node B (eNB) of infotination about the at least one target component carrier so that the source eNB forwards the information to the UE;
   a sending unit, configured to send a random access response message on at least one component carrier in the at least one target component carrier after a dedicated random access preamble sent by the UE is received; and
   means for allocating at least one new uplink component carrier to the UE after receiving a handover acknowledgement message sent by the UE.

8. The eNB according to claim 7, further comprising:
   a handover command sending unit, configured to send a component carrier handover command to a UE, wherein the component carrier handover command comprises information about at least one new component carrier re-selected for the UE and to which the UE is to be handed over, and
   a data transmission unit, configured to transmit data on the at least one the new component carrier re-allocated after completing the component carrier handover.

9. The eNB according to claim 7, wherein the notification unit is further configured to notify the source eNB of the information about the at least one target component carrier through a handover request acknowledgement message, wherein the source eNB is used to send the at least one target component carrier to the UE through a handover command.

10. The eNB according to claim 7, wherein the message receiving unit is configured to receive the handover request message sent by the source eNB, wherein the handover request message includes the UE's capability information about the at least one target component carrier being supported.

11. A terminal equipment, comprising:
   a handover command receiving unit, configured to receive a handover command sent by a source evolved Node B (eNB), wherein the handover command comprises information about at least one target component carrier configured by a target eNB or selected by the source eNB, and the at least one target component carrier is a carrier to which a User Equipment (UE) is to be handed over;
   a sending unit, configured to send a dedicated random access preamble to the target eNB after the handover command receiving unit receives the handover command;
   a random response receiving unit, configured to receive a random access response message on at least one downlink component carrier in the at least one target component carrier after the sending unit sends the dedicated random access preamble; and
   a component carrier receiving unit, configured to receive at least one new target component carrier allocated by the target eNB for the UE, after a handover acknowledgement message is sent to the target eNB.

12. The ten final equipment according to claim 11, wherein the terminal further comprises:
   a receiving unit, configured to receive a component carrier handover command sent by the target eNB, wherein the component carrier handover command comprises information about at least one new component carrier re-selected and to which the UE is to be handed over;
   a handover unit, configured to hand over the UE to the at least one new component carrier re-selected; and
   a transmission unit, configured to transmit data on the at least one new component carrier re-selected after handover.

* * * * *